INVENTOR
Thomas P. Vogl 3,363,962
INFRARED OPTICAL SYSTEM COMPRISING THREE LENS ELEMENTS
Thomas P. Vogl, Forest Hills, Pa., assignor to Westinghouse Electric Corporation, East Pittsburgh, Pa., a corporation of Pennsylvania
Filed May 11, 1964, Ser. No. 366,554
4 Claims. (Cl. 350—2)

ABSTRACT OF THE DISCLOSURE

This invention is directed to an infrared optical system. The invention includes three lens elements in which the entrance and exit lenses are of germanium and the intermediate lens is of cesium iodide or zinc sulfide. The critical dimensions of the elements and the air space between the elements are set forth.

---

This invention relates to optics and has particular relationship to optical systems for focusing or imaging infrared radiation. In its specific aspects this invention concerns itself with the transmission and focusing of infrared radiation in the wavelength band between 8 microns and 13 microns. This band is transmitted by the atmosphere and optical systems capable of transmitting and focusing this band are useful in the imaging and detecting of radiation passing through the atmosphere.

Optical systems are evaluated on the basis of several criteria, the more important criteria are:

(1) Resolution.
(2) Achromaticity—or absence of chromatic aberration.
(3) Magnitude of the proportion of the energy in the object which is present in the image.
(4) The field of view.
(5) Flatness of field or image plane.

Resolution is measured by the number of line pairs per unit length, typically per millimeter, in the object which can be identified in the image. A line pair consists of a line and the adjacent space between lines. Thus for black lines on a white background, a line pair consists of adjacent black and white lines.

Achromaticity is the focusing of radiation of various wavelengths of interest emanating from the same point on the object or source at the corresponding point on the image or in the image space which is the image counterpart of the point on the object for these wavelengths.

The magnitude of the proportion of energy in the image is determined by the ratio of the focal distance to the diameter of the aperture of the optical system. This is usually designated as an "$f$" number which may be expressed as the equation $$f/\text{number} = \frac{\text{focal distance}}{\text{aperture}}$$

The lower the number the greater the relative aperture and the higher the fraction of energy transmitted. In the case of a specific system with given materials of given thicknesses the proportion may be measured by measuring the intensity of the radiation at the object and image usually with thermocouples having hot junctions respectively at the object and image.

The field of view is measured by half the angle subtended at the optical system by the extreme points of an object, region or field on which the system is focused.

Optical systems in accordance with the teachings of the prior art have failed to meet the rigid demands for quality imposed in the areospace and related arts. It is an object of this invention to provide an optical system which shall meet such demands.

Another object of this invention is to provide an optical system the performance of which shall approach the diffraction limit of the optical wavelengths of interest and it is a further object of this invention to provide such a system which shall have a low $f$ number while at the same time manifesting a flat image plane.

In accordance with this invention an optical system is provided which includes an entrance lens, an intermediate lens, and an exit lens separated by air spaces. The lenses are of the meniscus type and the materials, curvatures and thicknesses of each of the lenses and the thicknesses of the air spaces are such that the performance approaches the diffraction limit. Specifically, the entrance lens and the exit lens are composed of optical quality intrinsic germanium and the intermediate lens is composed of a material which compensates for the aberration and dispersive effects introduced by the germanium lenses. It has been discovered that highly satisfactory results are produced with the intermediate lens composed of polycrystalline zinc sulfide which is sold by Eastman under the name Irtran-2 and also of crystalline cesium iodide. The germanium used in the practice of this invention has an index of refraction at radiation of 10 micron wavelength, $n_{10}$, of 4.0031; the $n_{10}$ for Irtran-2 is 2.1983; the $n_{10}$ for cesium iodide is 1.73916. In the practice of this invention an optical system for infrared radiation of wavelengths between 8 and 13 microns having an aperture of $f/0.75$, a resolving power of 33 lines per millimeter and a field of view of half angle 6° have been produced. This system is achromatized for radiation over the range of wavelengths from 8 microns to 13 microns.

Specifically, the following Table I presents the data on an optical system having a focal length of 3 inches and producing an image-plane diameter of ⅝-inch.

TABLE I

| Position | Radius of Surface | Thickness along optic axis (in.) | Material | Clear Aperture, Radius (in.) |
|---|---|---|---|---|
| Entrance lens | 4.9785" outer <br> 7.6389" inner | 0.4669 | Germanium | 2.1 |
| | | 1.2887 | Air Space. | |
| Intermediate lens | −3.6601" outer <br> −3.9390" inner | 0.67523 | Irtran-2 | 1.8 |
| | | 1.7742 | Air Space. | |
| Exit lens | 2.1819" outer <br> 2.3613" inner | 0.5381 | Germanium | .9 |

This optical system has an entrance aperture spaced .8227 inch outwardly from the apex of the outer surface of the entrance lens. The aperture has a diameter of 4.000 inches. The lens here described has an $f$/number of $f/0.75$ and a field of view having a half angle of 6° and a minimum resolution at high field angles and in secondary color of 20 line-pairs per millimeter. Typically, this lens is used to focus an image of an object emitting infrared radiation into a vacuum chamber having a window composed of Irtran-2 material and interposed between the inner surface of the exit lens and the focal plane. The focal distance from the inner surface of the exit lens is .3979 inch plus the ⅛-inch of the Irtran-2 window. The refocus distance of this system is .02190 inch.

Another optical system of f/0.75 for a 3-inch focal length has the properties in the following Table II.

TABLE II

| Position | Radius of Surface | Thickness along optic axis (in.) | Material | Clear Aperture, Radius (in.) |
|---|---|---|---|---|
| Entrance lens | 5.0175″ outer / 6.9939″ inner | 0.76457 | Germanium | 2.1 |
|  |  | 2.1950 | Air Space. |  |
| Intermediate lens | −3.8974″ outer / −685.83″ inner | 0.37567 | CsI | 1.0 |
|  |  | 0.85873 | Air Space. |  |
| Exit lens | 2.4017″ outer / 4.1124″ inner | 0.7074 | Germanium | 0.9 |

This lens has an entrance pupil spaced 2.3632 inches from the apex of the outer surface of the entrance lens. The entrance pupil again is 4.000 inches in diameter. The f/number in this case is again f/0.75 and the minimum resolution 33 line-pairs per millimeter. The focal distance from the inner surface of the exit lens is .4634 inch plus the thickness ⅛-inch of the Irtran-2 window which is typically used in the practice of this invention. The refocus distance for this lens is .0248 inch for this system. This system is diffraction limited over most of its field.

Certain novel features considered characteristic of this invention are disclosed above. For a better understanding of this invention, both as to its organization and as to its method of operation, together with additional objects and advantages thereof, reference is made to the following description taken in connection with the accompanying drawing, in which.

Figure 1:
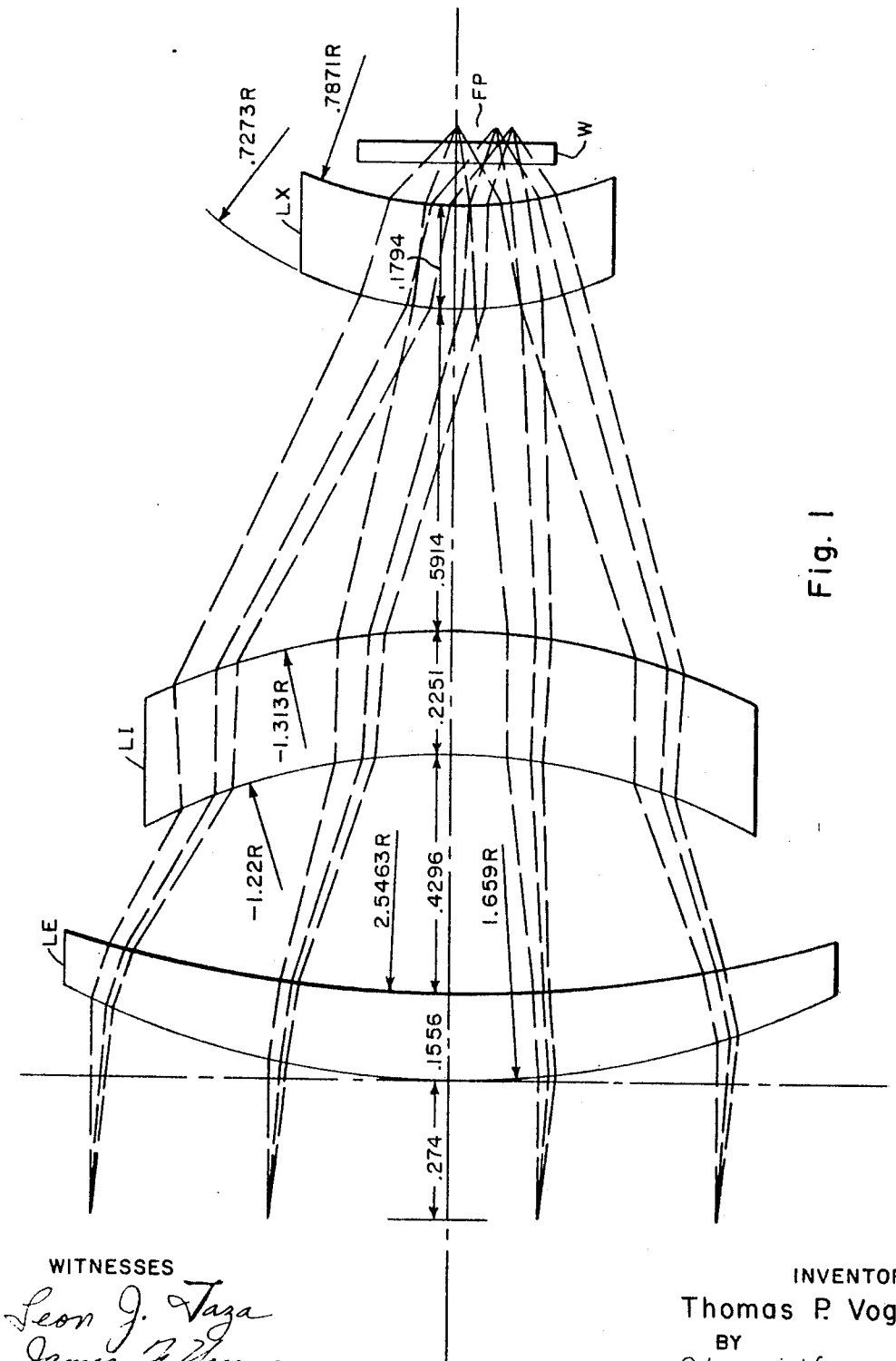
FIGURE 1 is a diagrammatic view showing an embodiment of this invention.

FIG. 1 shows an optical system including an entrance lens LE, an intermediate lens LI and an exit lens LX. Each lens is of the meniscus type and the lenses are separated by air spaces. The entrance lens LE and the exit lens LX are each composed of optical quality intrinsic germanium. The intermediate lens LI is composed of Irtran-2. The paths of the rays for infrared radiation of wavelengths between 8 and 13 microns through the lenses are shown in broken lines. These rays are seen to converge sharply in a focal plane spaced from the inner surface of the exit lens. A plane plate W of Irtran-2 is interposed between the inner surface of the exit lens LX and the focal plane FP on which the rays focus. The three focal points shown define this flat focal plane.

The radii of the surfaces of the lenses LE, LX and LI and the spacings along the optic axis, in inches, for an optical system of unit focal length are shown in FIG. 1. Systems having different focal lengths may be derived from this system by multiplying each item of the data given in the table by the magnitude of the focal length. The dimensions shown in FIG. 1 correspond to Table I.

Figure 2:
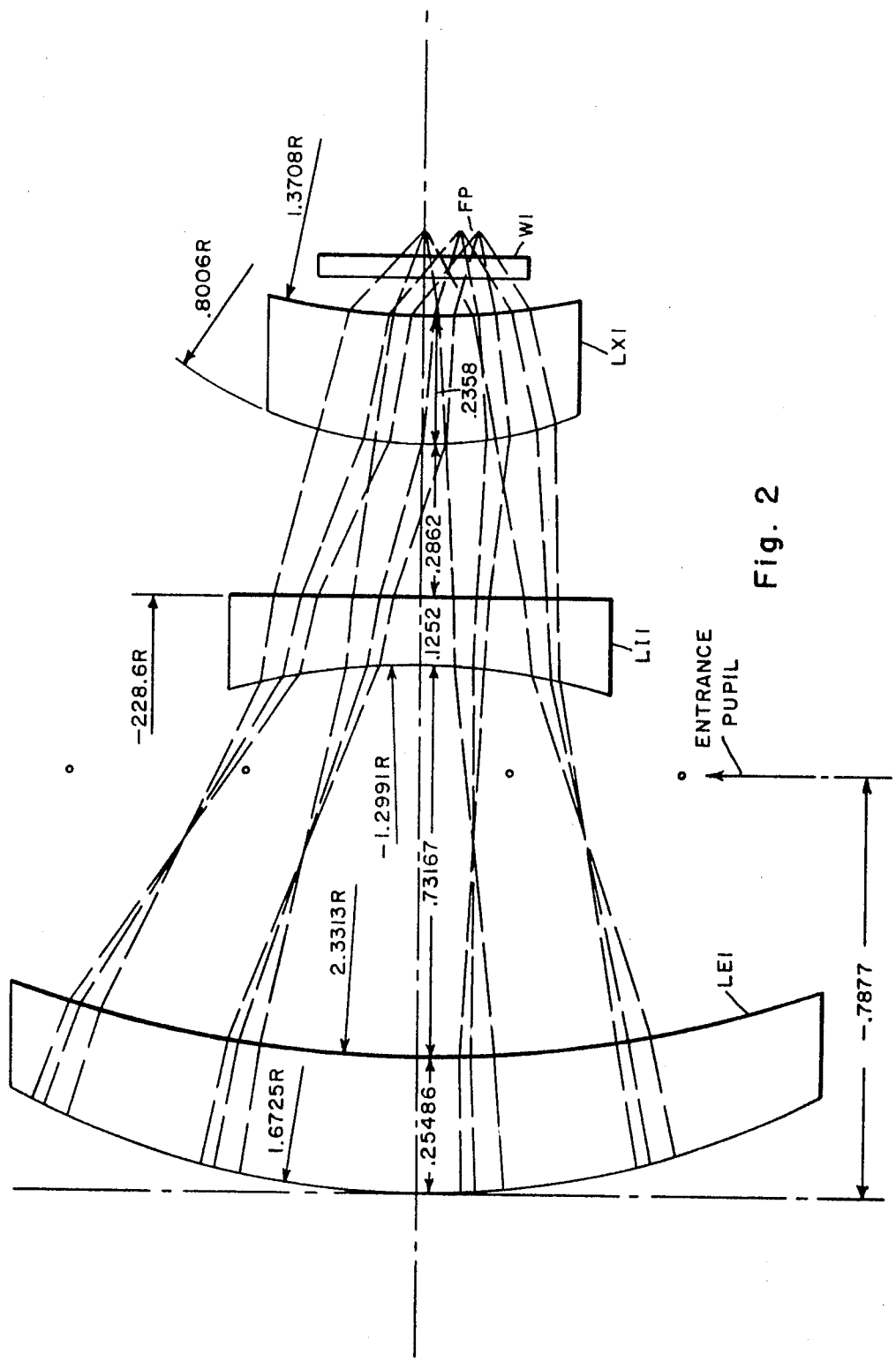
FIG. 2 is a diagrammatic view showing a modification of this invention.

In FIG. 2 another system is shown, in this case the entrance and exit lenses LE1 and LX1 are composed of optical quality intrinsic germanium and the intermediate lens LI1 is composed of crystalline cesium iodide. The dimensions in inches for this system are shown in FIG. 2 for 1-inch focal length. This system corresponds to Table II.

Figure 3:
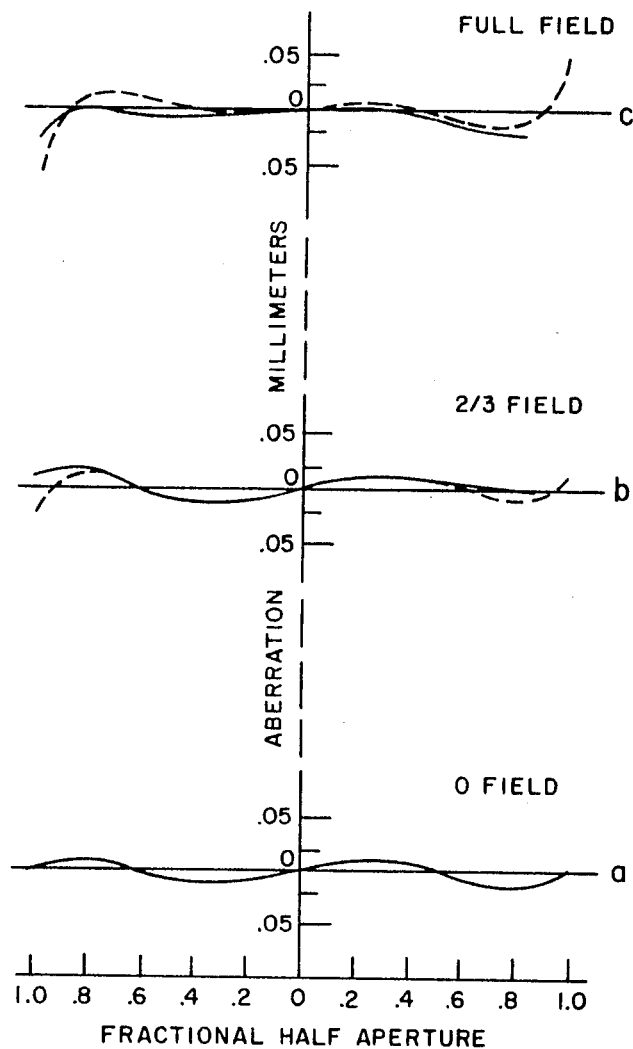
FIGS. 3 and 4 are each a set of graphs showing the sagittal and tangential field curves for the systems shown in FIGS. 1 and 2, respectively.
Figure 4:
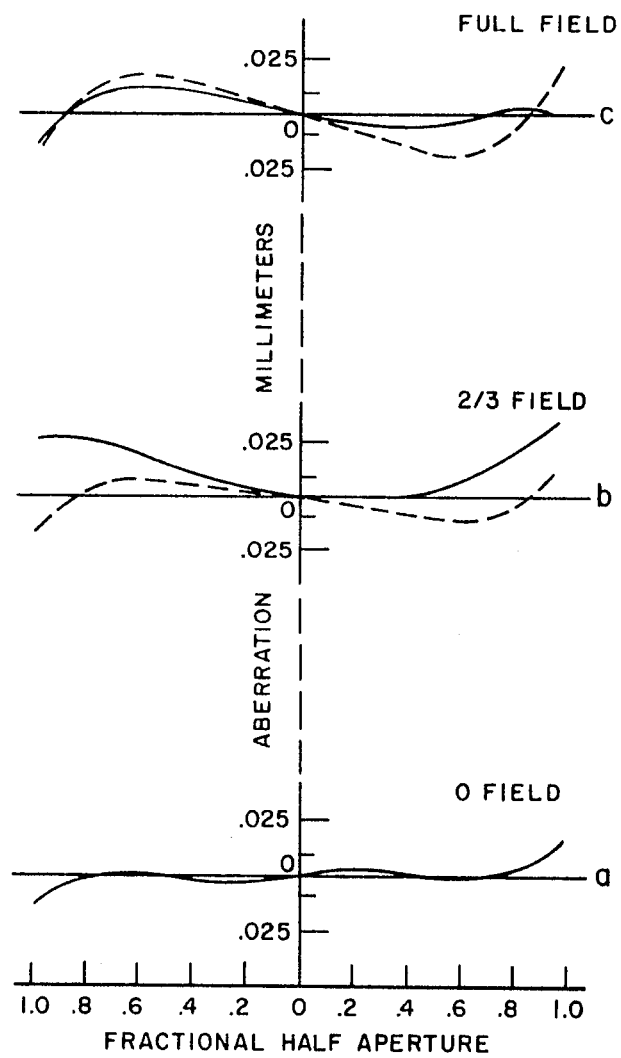

In each graph of FIGS. 3 and 4 the aberration in millimeters is plotted as a function of aperture height for the lenses of FIGS. 1 and 2 respectively. In FIGS. 3a and 4a the aberration for rays emanating from a point along the optic axis is plotted; in FIGS. 3b and 4b for rays emanating at a point ⅔ of distance between the optic axis and full field; and in FIGS. 3c and 4c for rays emanating at full field. In FIGS. 3b and 3c and 4b and 4c the tangential aberration is shown in full lines and the sagittal aberration in broken lines.

It is to be noted that the integrated path length error (area under curve) is about one quarter wavelength of the center transmitted wavelength. This is the criterion for attainment of diffraction limit in an optical system.

While preferred embodiments of this invention have been disclosed herein, many modifications thereof are feasible. This invention then is not to be limited except insofar as is necessitated by the spirit of the prior art.

I claim as my invention:

1. An optical system particularly for infrared radiation in the medium range of wavelengths typically between 8 microns and 13 microns comprising an entrance lens, an intermediate lens and an exit lens, said lenses being of the meniscus type having substantially spherical surfaces and being separated by air spaces having properties for 1 inch focal length, as specified in the following table:

| Position | Surface | Radius of Surface in inches | Thickness along optic axis in inches | Spacing in air spaces along optic axis in inches | Material of lens |
|---|---|---|---|---|---|
| Entrance lens | Outer / Inner | +1.6595 / +2.5463 | .1556 |  | Germanium. |
|  |  |  |  | .4296 | Air Space. |
| Intermediate lens | Outer / Inner | −1.220 / −1.313 | .2251 |  | Zinc Sulfide. |
|  |  |  |  | .5914 | Air Space. |
| Exit lens | Outer / Inner | +.7273 / +.7871 | .1704 |  | Germanium. | the spacing in the above table being measured along the optic axis from the inner surface of the entrance lens to the outer surface of the intermediate lens and from the inner surface of the intermediate lens to the outer surface of the exit lens.

2. The optical system of claim 1 having a focal plane displaced from the inner surface of the exit lens and having a window of infrared transmitting material interposed between said inner surface and said focal plane.

3. An optical system particularly for infrared radiation in the medium range of wavelengths typically between 8 microns and 13 microns comprising an entrance lens, an intermediate lens and an exit lens, said lenses being of the meniscus type having substantially spherical surfaces and being separated by air spaces having properties for 1 inch focal lengths, as specified in the following table:

| Position | Surface | Radius of Surface in inches | Thickness along optic axis in inches | Spacing in air spaces along optic axis in inches | Material of lens |
|---|---|---|---|---|---|
| Entrance lens | Outer | +1.6725 | .25486 | | Germanium. |
| | Inner | +2.3313 | | | |
| | | | | .73167 | Air Space. |
| Intermediate lens | Outer | −1.2991 | .1252 | | Cesium Iodide. |
| | Inner | −228.61 | | | |
| | | | | .2862 | Air Space. |
| Exit lens | Outer | +.8006 | .2353 | | Germanium. |
| | Inner | +1.3708 | | | | the spacing in the above table being measured along the optic axis from the inner surface of the entrance lens to the outer surface of the intermediate lens and from the inner surface of the intermediate lens to the outer surface of the exit lens.

4. The optical system of claim 3 having a focal plane displaced from the inner surface of the exit lens and having a window of infrared transmitting material interposed between said inner surface and said focal plane.

References Cited

UNITED STATES PATENTS 2,994,053  7/1961  DeWaard.
3,160,700  12/1964  Snyder _____ 350—2 X
3,305,291  2/1967  Snitchler _____ 350—1

OTHER REFERENCES

McCarthy: "The Reflection and Transmission of Infrared Material: I. Spectra from 2–50 Microns," Applied Optics, vol. 2, No. 6, June 1963, pp. 591–595.

DAVID H. RUBIN, *Primary Examiner.*

JOHN K. CORBIN, *Examiner.*